(12) United States Patent
Lee et al.

(10) Patent No.: US 12,291,289 B2
(45) Date of Patent: May 6, 2025

(54) STEERING CONTROL METHOD AND STEERING CONTROL DEVICE

(71) Applicant: HL MANDO CORPORATION, Gyeonggi-do (KR)

(72) Inventors: Jaewoo Lee, Gyeonggi-do (KR); Donghoon Shin, Seoul (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 92 days.

(21) Appl. No.: 18/143,176

(22) Filed: May 4, 2023

(65) Prior Publication Data

US 2024/0051601 A1    Feb. 15, 2024

(30) Foreign Application Priority Data

Aug. 12, 2022    (KR) .......................... 10-2022-0101183

(51) Int. Cl.
*B62D 5/04*    (2006.01)
(52) U.S. Cl.
CPC ................................. *B62D 5/0469* (2013.01)

(58) Field of Classification Search
CPC ...... B62D 5/0469; B62D 6/008; B62D 5/006; B62D 5/0421; B60Y 2400/83
See application file for complete search history.

(56) References Cited

U.S. PATENT DOCUMENTS

| | | | |
|---|---|---|---|
| 2012/0181765 A1* | 7/2012 | Hill | B62K 5/10 |
| | | | 903/902 |
| 2016/0221575 A1* | 8/2016 | Posch | B60W 30/12 |
| 2016/0221601 A1* | 8/2016 | Barthomeuf | B62D 5/0469 |
| 2017/0066474 A1* | 3/2017 | Toda | B62D 5/0466 |
| 2017/0327148 A1* | 11/2017 | Held | E21C 29/22 |
| 2020/0139782 A1* | 5/2020 | Goto | F16F 9/50 |
| 2022/0153265 A1* | 5/2022 | Kim | B60W 60/001 |
| 2023/0077259 A1* | 3/2023 | Katzourakis | B60W 60/001 |

* cited by examiner

*Primary Examiner* — Joseph J Dallo
(74) *Attorney, Agent, or Firm* — WOMBLE BOND DICKINSON (US) LLP

(57) ABSTRACT

The steering control method and steering control device may reduce memory usage by calculating virtual end stop torque without using a lookup table and address the noise issue at a discontinuous point. Further, it is possible to determine whether the end stop start angle needs to be adjusted because the wheel touches the curb, and adjust the end stop start angle to protect the steering wheel and the system.

20 Claims, 8 Drawing Sheets

STEERING CONTROL METHOD AND STEERING CONTROL DEVICE

CROSS-REFERENCE TO RELATED APPLICATION

This application claims priority from Korean Patent Application No. 10-2022-0101183, filed on Aug. 12, 2022, which is hereby incorporated by reference for all purposes as if fully set forth herein.

BACKGROUND

Field

The present embodiments relate to a steering control method and a steering control device.

Description of Related Art

Vehicle steering assist systems include hydraulic steering assist systems that steers the vehicle by generating hydraulic pressure by a pump and electric steering assist systems that steer the vehicle by a motor.

Recently, steer-by-wire systems are adopted in vehicles to electrically drive the vehicle wheels without mechanical connections between the steering wheel and the wheels. The steer-by-wire steering device performs vehicle steering by operating the steering motor connected to the wheels under the control of the electronic control unit (ECU) detecting the rotation signal of the steering wheel.

The steer-by-wire steering device is constituted of a steer wheel feedback actuator (SFA) and a road wheel actuator (RWA), and since the two systems are not mechanically connected, it may advantageously utilize a variable gear ratio (VGR) where the ratio between the steering angle of SFA and the rack position of RWA may be freely set. Therefore, when the velocity of the vehicle changes, the end angle of the SFA should change as well, and a need exists for a method for creating a virtual end part that gives a feeling similar to that of the steering wheel mechanism locking part.

Conventionally, if the steering angle reaches the end stop start angle, the reaction force motor is controlled by calculating a virtual end stop torque according to the increase in steering angle using a lookup table. When the lookup table is used, memory usage may be increased, steering feeling may be deteriorated due to end stop torque that is not constant according to tuning, and noise may be generated at discontinuous points.

BRIEF SUMMARY

The present embodiments may provide a steering control method and steering control device that may reduce memory usage by calculating virtual end stop torque without using a lookup table and address the noise issue at a discontinuous point.

The present embodiments may also provide a steering control method and steering control device that may determine whether the end stop start angle needs to be adjusted because the wheel touches the curb and adjust the end stop start angle to protect the steering wheel and the system.

In an aspect, the present embodiments may provide a steering control device comprising a receiving step of receiving steering angle information from a steering angle sensor and a control step of controlling an output of a reaction force motor based on a virtual end stop torque upon determining that a preset end stop start angle is reached based on the steering angle information, wherein the virtual end stop torque is calculated by adding a virtual spring torque and a damper torque calculated based on the virtual spring torque, and wherein the virtual spring torque is calculated by a normalized angle calculated based on the steering angle information.

In another aspect, the present embodiments may provide a steering control device comprising a receiver receiving steering angle information from a steering angle sensor and a controller controlling an output of a reaction force motor based on a virtual end stop torque upon determining that a preset end stop start angle is reached based on the steering angle information, wherein the virtual end stop torque is calculated by adding a virtual spring torque and a virtual damper torque calculated based on the virtual spring torque, and wherein the virtual spring torque is calculated by a normalized angle calculated based on the steering angle information.

According to the present embodiments, the steering control method and steering control device may reduce memory usage by calculating virtual end stop torque without using a lookup table and address the noise issue at a discontinuous point.

Further, according to the present embodiments, the steering control method and steering control device may determine whether the end stop start angle needs to be adjusted because the wheel touches the curb, and adjust the end stop start angle to protect the steering wheel and the system.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
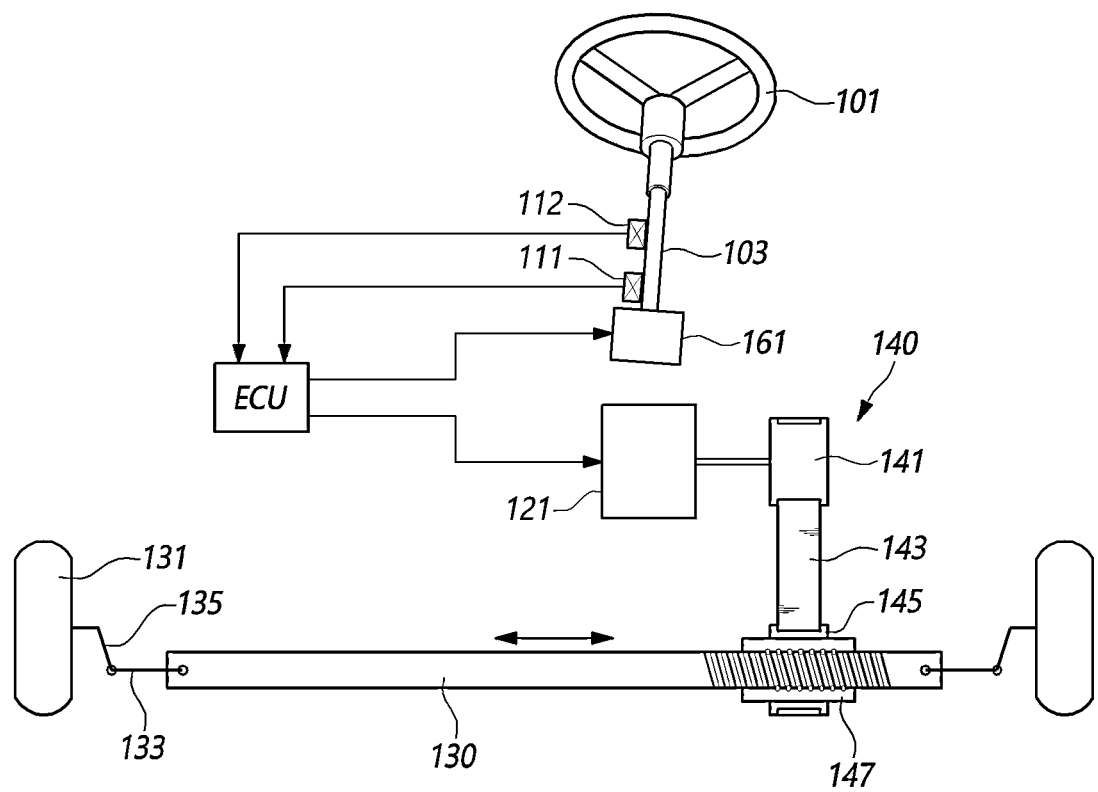
FIG. 1 is a view schematically illustrating a steering device according to the present embodiments.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors e.g., process factors, internal or external impact, noise, etc.) even when a relevant description is not specified. Further, the term "may" fully encompasses all the meanings of the term "can".

FIG. 1 is a view schematically illustrating a steering device according to the present embodiments.

Referring to FIG. 1, in a steer-by-wire steering device, a steering angle sensor 112 and a torque sensor 111 are coupled to one side of a steering shaft 103 connected with a steering wheel 101. When the driver manipulates the steering wheel 101, the steering angle sensor 112 and the torque sensor 111 detect it and send an electrical signal to an electronic control unit (ECU) to thereby operate a reaction force motor 161 included in a steering feedback actuator and an auxiliary power motor 121 included in a road wheel actuator.

The electronic control unit (ECU) controls the steering feedback actuator (SFA), which is an upper end device, and the road wheel actuator (RWA), which is a lower end device, based on the electrical signals transmitted from the steering angle sensor 112 and the torque sensor 111 and electrical signals transmitted from other several sensors mounted to the vehicle.

The auxiliary power motor 121 provided in the RWA slides the rack bar 130 connected with a belt-type transmission 140 to steer the two opposite wheels through the tie roads 133 and knuckle arms 135. The belt-type transmission 140 may include a motor pulley 141 coupled to the rotational shaft of the auxiliary power motor 121, a nut pulley 145 coupled to the outer circumferential surface of the ball nut 147, and a belt 143 connecting the motor pulley 141 and the nut pulley 145.

The reaction force motor 161 provided in the SFA generates a steering reaction force sensation in the opposite direction when the driver manipulates the steering wheel 101 or steers the steering shaft 103 upon autonomous driving based on the operation of the RWA by the auxiliary power motor 121.

Although FIG. 1 illustrates that the steering angle sensor 112 and the torque sensor 111 are provided on the steering shaft 103 for convenience of description, the vehicle may further include a motor position sensor and various radar devices, or camera image sensor to transmit steering information to the electronic control unit (ECU), which is omitted from the following detailed description.

Conventionally, if the steering angle reaches the end stop start angle, the reaction force motor 161 is controlled by calculating a virtual end stop torque according to the increase in steering angle using a lookup table. When the lookup table is used, memory usage may be increased, steering feeling may be deteriorated due to end stop torque that is not constant according to tuning, and noise may be generated at discontinuous points.

Figure 2:
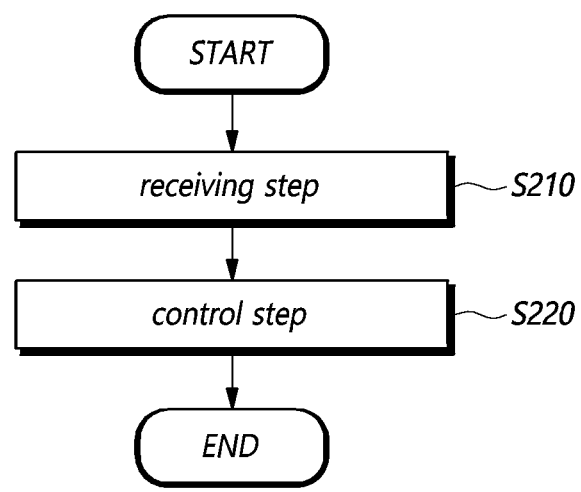
FIG. 2 is a flowchart illustrating a steering control method according to the present embodiments.

FIG. 2 is a flowchart illustrating a steering control method according to the present embodiments.

Referring to FIG. 2, the steering control method according to the present embodiments may include a receiving step S210 of receiving steering angle information from a steering angle sensor.

The receiving step may receive steering angle information from the steering angle sensor. However, the present embodiments are not limited thereto. For example, the receiving step may further receive vehicle state information, dynamics information, and the like from various sensors included in the vehicle, such as a rack position sensor, a rack force sensor, and a vehicle velocity sensor.

The steering angle information may refer to rotation angle information about the steering wheel. The steering angle information may include rotation angle information in which right rotation angles from the neutral position of the steering wheel have positive values, and left rotation angles from the neutral position have negative values. However, without limitations thereto, the steering angle information may also include rotation angle information in which right rotation angles have negative values, and left rotation angles have positive values.

Referring to FIG. 2, the steering control method according to the present embodiments may include a control step (S220) of controlling the output of the reaction force motor based on the virtual end stop torque upon determining that a preset end stop start angle is reached based on the steering angle information. For example, the steering control method may include a control step of calculating a normalized angle based on the steering angle information, calculating a virtual spring torque based on the normalized angle, calculating a virtual damper torque based on the virtual spring torque, calculating a virtual end stop torque by adding the virtual spring torque and the virtual damper torque, and controlling the output of the reaction force motor based on the virtual end stop torque.

The control step may determine whether the preset end stop start angle is reached based on the steering angle information.

The end stop start angle may be preset and stored. However, the end stop start angle is not a fixed value, and the end stop start angle may be adjusted if a curb condition and a condition for changing the end stop start angle are met. Further, an end stop end angle may also be previously set and stored, and the end stop end angle may be adjusted when the end stop start angle is adjusted.

The control step may calculate a normalized angle based on the steering angle information when it is determined that the preset end stop start angle is reached based on the steering angle information. For example, the control step may calculate the normalized angle based on steering angle information, an end stop start angle, and a preset change angle range.

The preset change angle range may refer to an angle range in which the virtual end stop torque value is changed for a virtual end stop. The change angle range may be preset as an angle range experimentally calculated and stored. However, without limitations thereto, the change angle range may be adjusted to an angle range different from a preset angle range.

Since the control step calculates the virtual end stop torque based on the normalized angle rather than the angle information about the measured steering angle, the calculation of the virtual end stop torque and the control thereby may be more easily performed.

The control step may calculate the virtual spring torque based on the normalized angle.

For example, the control step may calculate the virtual spring torque based on the normalized angle and a preset maximum spring torque.

The maximum spring torque may refer to a maximum torque by a virtual spring, experimentally calculated and stored. The virtual spring may refer to a virtual structure for end stop control in a steer-by-wire steering device.

The virtual spring torque is calculated based on a second or higher-order differentiable equation, and the equation may meet preset initial and final conditions. The preset initial and final conditions may be set to six conditions that meet each of the equation, first order differential equation, and second order differential equation. However, without limitations thereto, the number of initial conditions and final conditions may be increased according to a third or higher-order differentiable equation.

The virtual spring torque is calculated based on a second or higher-order differentiable equation, and as the equation meets the preset initial and final conditions, it is possible to block the noise generated at the point where the increase in the virtual spring torque starts and the point where the maximum value is reached.

If at least one of the preset change angle range or the preset maximum spring torque is changed, the coefficient of the equation for calculating the virtual spring torque may be automatically changed, so that the virtual spring torque may be calculated.

The control step may calculate a virtual damper torque based on the virtual spring torque.

Within the virtual end stop range, the virtual spring torque may maintain a constant value until the end stop angle after reaching the maximum value. When the steering angle reaches the end stop end angle, an impact may occur on the steering wheel in the process of giving a feeling that the steering wheel mechanism is locked. Therefore, it is necessary to calculate virtual damper torque to prevent impact that may occur on the steering wheel.

The control stage may calculate the virtual damper torque using the normalized angle and spring torque, steering angular velocity and a preset damping ratio.

The virtual damper may refer to a virtual structure for preventing an impact that may occur on the steering wheel in the process of giving a feeling of locking the mechanism. The virtual damper torque may refer to the torque output by the virtual damper.

The steering angular velocity may be sensed and received by the steering angular velocity sensor. However, the present embodiments are not limited thereto. For example, the steering angular velocity may be calculated based on steering angle information received by the steering angle sensor that senses the steering angle at a preset cycle.

The damping ratio may be preset and stored as a damping ratio to prevent impact that may occur on the steering wheel. However, the damping ratio may be changed and stored by settings.

The control step may add the virtual spring torque and the virtual damper torque to calculate a virtual end stop torque, and control the output of the reaction force motor based on the virtual end stop torque. Therefore, it is possible to create a virtual end part that gives a feeling similar to a steering wheel mechanism locking part through output control of the reaction force motor.

Although not shown in FIG. 2, the steering control method according to the present embodiment may further include a curb determining step of determining whether the end stop start angle needs to be adjusted as the wheel touches the curb after the receiving step (not shown).

For example, the receiving step further receives rack position information and rack force information, and the curb determining step determines whether a condition for changing the preset end stop start angle is met based on the steering angle information, rack position information and rack force information and, if the change condition is met, may change the preset end stop start angle based on the steering angle information.

Further, the curb determining step may determine whether a condition for releasing the changed end stop start angle is met based on the rack position information and the rack force information received after the end stop start angle is changed and readjust the end stop start angle.

For example, the curb determining step may return the changed end stop start angle to the preset end stop start angle if the release condition is met. As another example, the curb determining step may maintain the changed end stop start angle if the release condition is not met. In other words, the curb determining step may return the changed end stop start angle to the preset end stop start angle or maintain the changed end stop start angle based on information received after the end stop start angle is changed.

The curb determining step may change the end stop end angle based on a preset end stop angle range if the preset end stop start angle is changed. The preset end stop angle range may mean an angle range stored and set as a value experimentally calculated and stored for virtual end stop.

The control step may calculate the normalized steering angle, virtual spring torque, virtual damper torque, and virtual end stop torque based on the changed end stop start angle and changed end stop end angle in the curb determining step, thereby protecting the steering wheel and system in a state in which the steering direction of the vehicle wheels cannot be changed due to an object, such as a curb, and addressing the noise issue that may occur when the mechanism lock feeling occurs on the steering wheel. In other words, the steering control method according to the present embodiments may perform curb determination and virtual spring torque calculation with a single logic.

According to the present embodiments, the steering control method may reduce memory usage by calculating virtual end stop torque without using a lookup table and address the noise issue at a discontinuous point. Further, according to the present embodiments, the steering control method may determine whether the end stop start angle needs to be adjusted because the wheel touches the curb, and adjust the end stop start angle to protect the steering wheel and the system.

If the curb condition is met, the steering wheel and system may be protected by adjusting the end stop start angle according to the preset condition.

Figure 3:
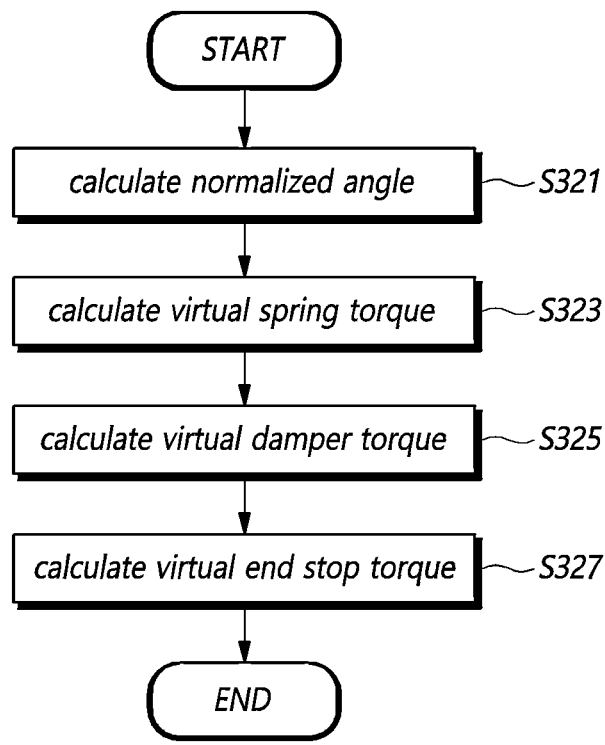
FIG. 3 is a flowchart illustrating a control step in a steering control method according to the present embodiments.
Figure 4:
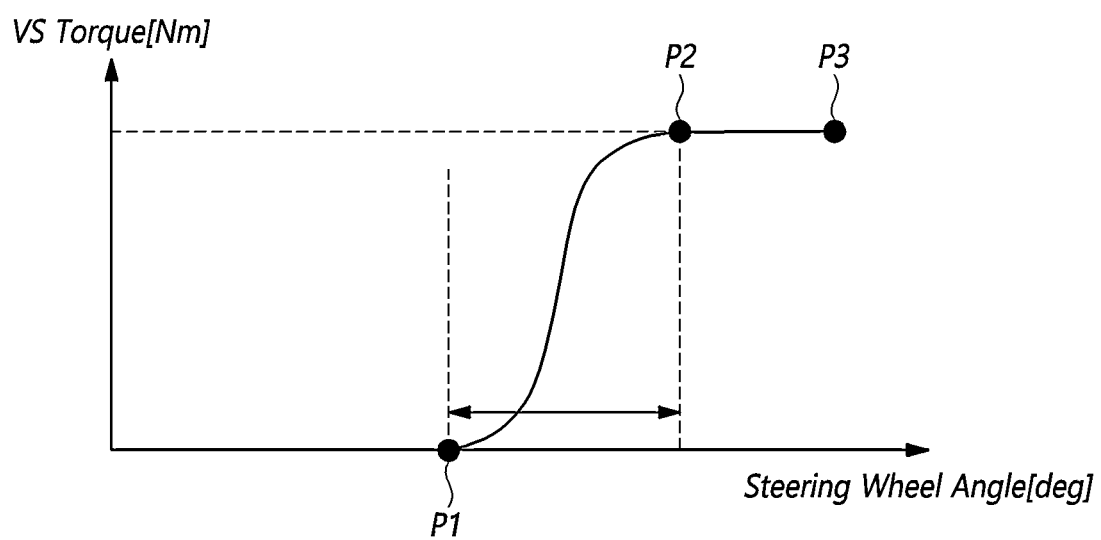
FIG. 4 is a graph illustrating a virtual spring torque calculated by a steering control method according to the present embodiments.

FIG. 3 is a flowchart illustrating a control step in a steering control method according to the present embodiments. FIG. 4 is a graph illustrating a virtual spring torque calculated by a steering control method according to the present embodiments.

Referring to FIG. 3, the control step may calculate the normalized angle (S321).

For example, the control step may calculate the normalized angle based on steering angle information, an end stop start angle, and a preset change angle range.

The normalized angle may be calculated based on a value produced by dividing the difference between the end stop start angle and the steering angle currently measured by the steering angle information by a preset change angle range.

The normalized angle may be calculated based on Equation 1 below.

$$\theta_n = sat\left(\frac{\Delta\theta_{sw}}{\Delta\theta_{max}}\right), sat(x)\begin{cases} x & |x| < 1 \\ \text{sign}(x) & \text{otherwise} \end{cases}, \quad \text{[Equation 1]}$$

$$\text{sign}(x)\begin{cases} 1 & x > 0 \\ 0 & x = 0 \\ -1 & x < 0 \end{cases}$$

In Equation 1 above, $\Delta\theta_{sw}$ may mean the difference between the end stop start angle and the steering angle currently measured by steering angle information, and $\Delta\theta_{max}$ may mean the preset change angle range.

If the normalized angle is a positive number, it may mean that the steering wheel is rotated to the right with respect to the neutral position of the steering wheel and, if the normalized angle is a negative number, it may mean that the steering wheel is rotated to the left with respect to the neutral position of the steering wheel. However, without limitations thereto, a negative number may mean a state of being rotated to the right, and a positive number may mean a state of being rotated to the left.

The normalized angle may be calculated as a value from 0 to −1 or from 0 to 1. In other words, although the value produced by dividing the difference between the end stop start angle and the steering angle currently measured by the steering angle information by the preset change angle range exceeds −1 or 1, it may be calculated as a constant value, e.g., −1 or 1. Accordingly, since the virtual spring torque, virtual damper torque, and virtual end stop torque are calculated based on the normalized angle, rather than the angle information about the measured steering angle, control by the virtual end stop torque and torque calculation may be easy.

Referring to FIG. 3, the control step may calculate the virtual spring torque based on the normalized angle (S323).

The control step may calculate the virtual spring torque based on the normalized angle and a preset maximum spring torque. In this case, the virtual spring torque is calculated based on a second or higher-order differentiable equation, and the equation may meet preset initial and final conditions.

As an example, the preset initial condition and final condition are conditions for the equation, conditions for the first order differential equation, and conditions for the second order differential equations, and six conditions may be set based on the initial and final values.

The initial condition may be preset by Equation 2 below, and the final condition may be preset by Equation 3 below.

$$T_{spring}(0) = 0, \quad \frac{\partial T_{spring}}{\partial \theta_n}(0) = 0, \quad \frac{\partial^2 T_{spring}}{\partial \theta_n^2}(0) = 0 \quad \text{[Equation 2]}$$

$$T_{spring}(1) = T_{spring\_max}, \quad \frac{\partial T_{spring}}{\partial \theta_n}(1) = 0, \quad \frac{\partial^2 T_{spring}}{\partial \theta_n^2}(1) = 0 \quad \text{[Equation 3]}$$

In Equation 3, $T_{spring\_max}$ is the preset maximum spring torque.

Referring to FIG. 4, the graph means the virtual spring torque calculated according to changes in virtual spring torque. P1 means the end stop start angle, P2 means the steering angle at which the preset maximum spring torque is calculated, and P3 means the end stop end angle. The preset change angle range may mean an angle range from P1 to P2, and the end stop angle range, which is a virtual end stop range, may mean an angle range from P1 to P3.

It is calculated based on a second or higher-order differentiable equation, and the virtual spring torque meeting the preset initial and final conditions may be calculated as a value having a gentle curve at point P1 and point P2 as shown in the graph. Therefore, it is possible to block noise that may occur at the point where the increase in virtual spring torque starts and the point where the maximum value is reached.

The virtual spring torque is calculated based on the preset change angle range and the preset maximum spring torque. Therefore, when at least one of the preset change angle range or the preset maximum spring torque is changed, the coefficient of the equation for calculating the virtual spring torque is automatically changed based on the changed value, producing the virtual spring torque.

When the steering angle reaches point P3 which is the end stop end angle, an impact may occur on the steering wheel in the process of giving a feeling that the steering wheel mechanism is locked. Therefore, it is necessary to calculate virtual damper torque to prevent impact that may occur on the steering wheel.

Referring back to FIG. 3, the control step may calculate the virtual damper torque based on the virtual spring torque (S325).

For example, the control stage may calculate the virtual damper torque using the normalized angle and spring torque, steering angular velocity and a preset damping ratio. The virtual damper torque may be calculated based on Equation 4 below.

$$T_{damper}(\theta_n) = B_{virtual}(\theta_n)\omega_{sw}, \quad \text{[Equation 4]}$$

$$B_{virtual}(\theta_n) = 2\sqrt{J_{sw} \times K_{virtual}(\theta_n)} \times \zeta_{virtual},$$

$$K_{virtual}(\theta_n) = \frac{T_{spring}(\theta_n)}{\Delta\theta_{max} \times \theta_n}$$

In Equation 4 above, $T_{damper}(\theta_n)$, $B_{virtual}$, $\omega_{sw}$, $J_{sw}$, $\zeta_{virtual}$, and $K_{virtual}$ mean the virtual damper torque, the virtual damper constant, the steering angular velocity, the steering wheel inertia, the damping ratio, and the virtual spring torque constant, respectively.

Therefore, the virtual spring torque constant is calculated based on the preset change angle range, normalized angle, and spring torque, the virtual damper constant is calculated based on the virtual spring torque constant, the preset damping ratio, and steering wheel inertia determined according to the steering wheel, and the virtual damper torque is calculated based on the virtual damper constant and the steering angular velocity.

Since the virtual damper torque is calculated considering the change in steering angular velocity, it is possible to enhance the accuracy of preventing impact that may occur at the end stop end point Referring to FIG. 3, the control step may add the virtual spring torque and the virtual damper torque to calculate the virtual end stop torque (S327). The control step may create a virtual end part that gives a feeling similar to that of the steering wheel mechanism locking part by controlling the output of the reaction force motor based on the calculated virtual end stop torque.

Figure 5:
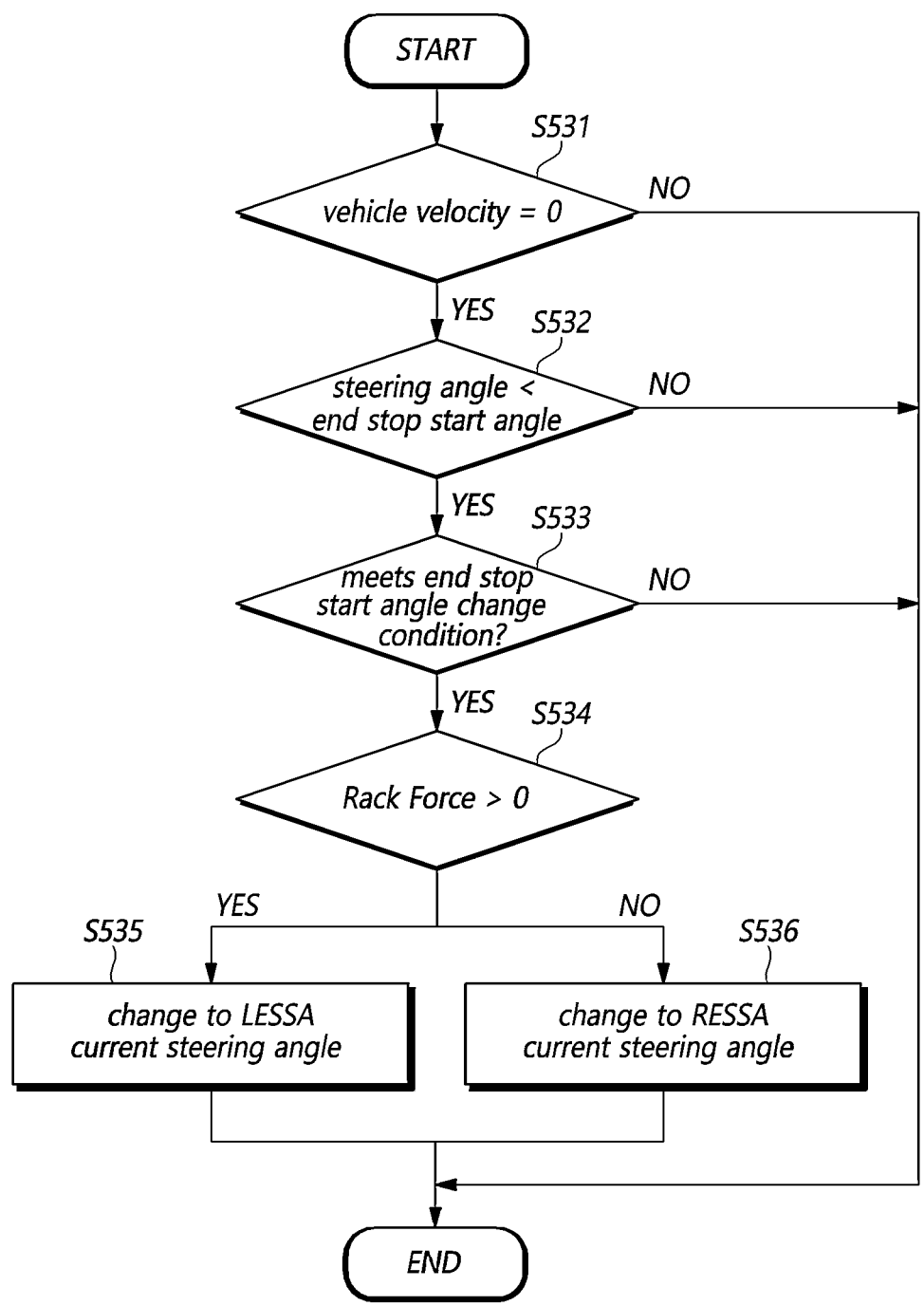
FIGS. 5 and 6 are flowcharts illustrating adjusting an end stop start angle in the curb determining step in a steering control method according to the present embodiments.
Figure 6:
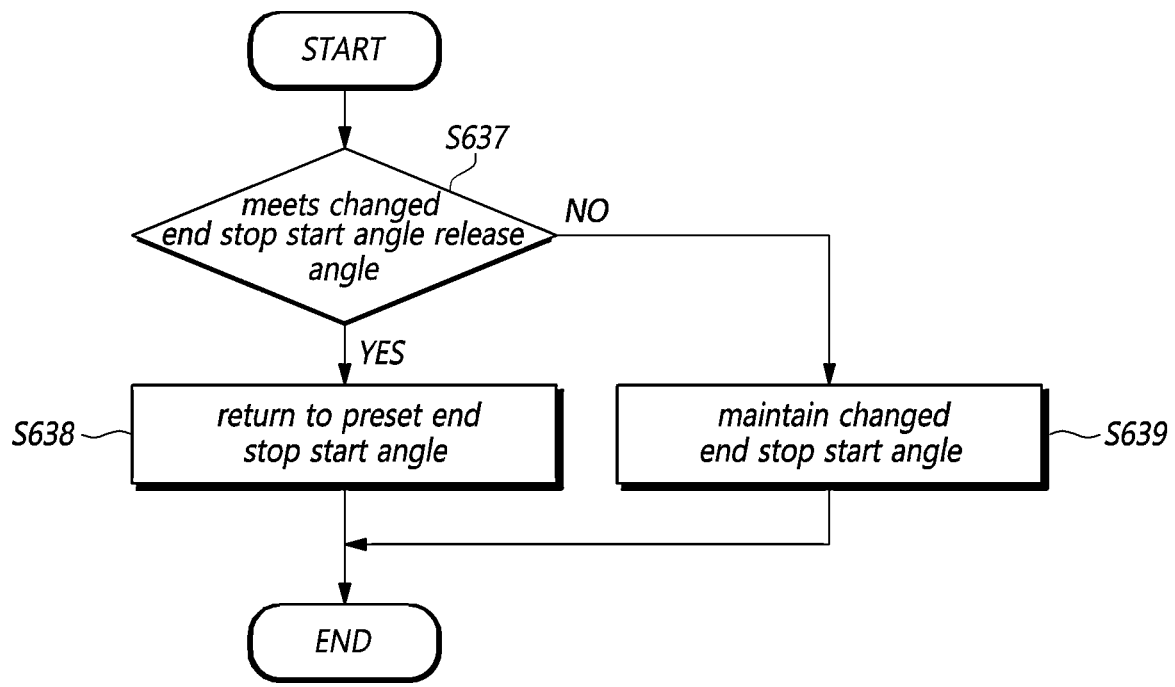

FIGS. 5 and 6 are flowcharts illustrating adjusting an end stop start angle in the curb determining step in a steering control method according to the present embodiments.

Referring to FIG. 5, the curb determining step may determine whether the end stop start angle needs to be adjusted as the wheel touches the curb.

The curb determining step may determine whether vehicle velocity is 0 (S531). Adjusting the end stop start angle in a driving state where the vehicle velocity is not zero may cause problems with driving stability of the vehicle. Therefore, the adjustment of the end stop start angle may be made only in the stop state where the vehicle velocity is zero.

The curb determining step may determine whether the steering angle is smaller than the end stop start angle (S532). When the steering angle is larger than the end stop start angle, the virtual end stop may be performed. Thus, adjustment of the end stop start angle need may not be necessary. Accordingly, the end stop start angle may be adjusted only in a state in which the virtual end stop is not made because the steering angle is smaller than the end stop start angle.

The curb determining step may determine whether the condition for changing the preset end stop start angle is met. A plurality of change conditions may be preset and, when all the conditions are met, it may be determined that adjustment of the preset end stop start angle is necessary as the wheel touches the curb.

For example, the curb determination step may determine that the condition for changing the preset end stop start angle is met so that the end stop start angle needs to be adjusted when the absolute value of the rack position difference calculated as the difference between the rack position estimation value based on the steering angle information and the rack position sensing value based on the sensed rack position information is larger than a preset first rack position threshold value, the absolute value of the rack force based on the rack force information is larger than a preset first rack force threshold value, the absolute value of the rack position velocity based on the rack position information is smaller than a preset rack position velocity threshold value, and the value obtained by multiplying the rack position difference by the rack force is larger than 0.

The condition for changing the end stop start angle may be set based on the rack position and the rack force and may thus respond to a change in road surface, with its accuracy enhanced.

The curb determining step may determine whether the rack force is larger than 0 if the condition for changing the end stop start angle is met (S534). The rack force being a value larger than 0 may mean that the position of the steering wheel has been rotated to the left from the neutral position, and the rack force being a value equal to or less than 0 may mean that the position of the steering wheel has been rotated to the left from the neutral position. Hereinafter, such a state is described as an example, but the rotation direction based on whether the rack force is a value larger than 0 may mean the direction opposite to the direction in the example.

The curb determining step may change the left end stop start angle (LESSA) of the steering wheel to the currently received left steering angle when the rack force is a value larger than 0.

The curb determining step may change the right end stop start angle (RESSA) of the steering wheel to the currently received right steering angle when the rack force is a value equal to or less than 0.

Referring to FIG. 6, the curb determining step may determine whether the condition for releasing the changed end stop start angle is met (S637). A plurality of release conditions may be preset and, when all the conditions are met, it may be determined that readjustment of the changed end stop start angle is necessary as the wheel escapes off the curb.

For example, the curb determination step may determine that the condition for releasing the changed end stop start angle is met so that the end stop start angle needs to be readjusted when the absolute value of the rack position difference calculated as the difference between the rack position estimation value based on the steering angle information and the rack position sensing value based on the sensed rack position information is smaller than a preset second rack position threshold value, the absolute value of the rack force based on the rack force information is smaller than a preset second rack force threshold value, and the value obtained by multiplying the rack position difference by the rack force is smaller than 0.

The first rack position threshold and the first rack force threshold in the above-described change condition may be set to values different from the second rack position threshold and the second rack force threshold in the release condition. Therefore, readjustment of the end stop start angle may be stopped from being performed within a predetermined range, so that accuracy may be enhanced.

Further, since the rack position velocity is a value considered to enhance the accuracy of adjusting the end stop start angle, the rack position velocity threshold may be set only under the change condition.

The curb determining step may return the changed end stop start angle to the preset end stop start angle if the release condition is met (S638). When the release condition is met, it may mean that the wheel has escaped off the curb, and thus, the accuracy of the virtual end stop may be enhanced by returning to the preset end stop start angle.

Meanwhile, the curb determining step may maintain the changed end stop start angle if the release condition is not met (S639). If the release condition is not met, it may mean a state in which the wheel has failed to escape off the curb, so that the changed end stop start angle may be maintained.

Figure 7:
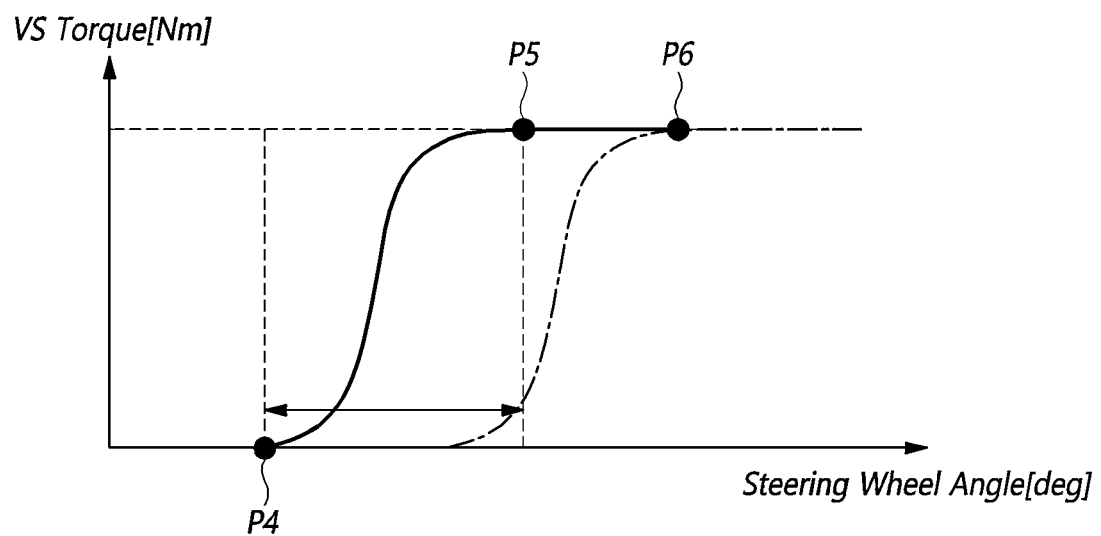
FIG. 7 is a graph illustrating a virtual spring torque calculated when adjusting an end stop start angle in a steering control method according to the present embodiments.

FIG. 7 is a graph illustrating a virtual spring torque calculated when adjusting an end stop start angle in a steering control method according to the present embodiments.

The curb determining step may change the end stop end angle based on a preset end stop angle range if the preset end stop start angle is changed. Accordingly, the control step may calculate the normalized steering angle and the virtual spring torque based on the changed end stop start angle and the changed end stop end angle in the curb determining step.

Referring to FIGS. 4 and 7, the end stop start angle may be changed from P1 in FIGS. 4 to P4 in FIG. 7 in the curb determining step. In this case, the curb determining step may change the end stop end angle from P3 in FIGS. 4 to P6 in FIG. 7 based on a preset end stop angle range in which a virtual end stop is made.

The changed end stop start angle and the changed end stop end angle may change the calculated normalized steering angle value by the above-described Equation 1, and the changed normalized steering angle may change the calculated virtual spring torque value. For example, as the normalized angle changes, the steering angle at which the maximum spring torque is calculated may be changed from point P2 in FIGS. 4 to P5 in FIG. 7.

Further, since the virtual damper torque is calculated based on the virtual spring torque, and the virtual end stop torque is calculated by adding the virtual spring torque and the virtual damper torque, the virtual damper torque and the virtual end stop torque may also change.

Accordingly, the control step may calculate the normalized steering angle, virtual spring torque, virtual damper torque, and virtual end stop torque based on the changed end stop start angle and changed end stop end angle in the curb determining step, thereby protecting the steering wheel and system in a state in which the steering direction of the vehicle wheels cannot be changed due to an object, such as a curb, and addressing the noise issue that may occur when the mechanism lock feeling occurs on the steering wheel. In other words, the steering control method according to the present embodiments may perform curb determination and virtual spring torque calculation with a single logic.

A steering control device capable of performing the steering control method described in connection with FIGS. 2 to 7 is briefly described again below. The steering control device described below may perform all or some operations of the above-described steering control method. Further, the steering control device may perform any combination of the above-described embodiments.

Figure 8:
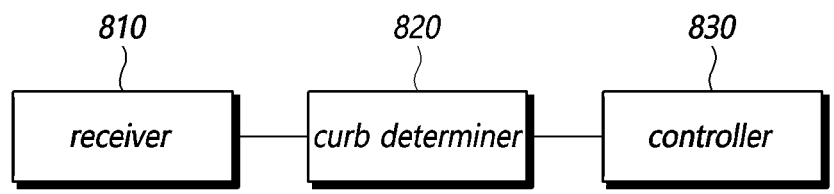
FIG. 8 is a block diagram illustrating a steering control device according to the present embodiments.

FIG. 8 is a block diagram illustrating a steering control device according to the present embodiments.

Referring to FIG. 8 control device according to the present embodiments may include a receiver 810 receiving steering angle information from a steering angle sensor.

The receiver 810 may receive steering angle information from the steering angle sensor. However, the present embodiments are not limited thereto. For example, the receiver 810 may further receive vehicle state information, dynamics information, and the like from various sensors included in the vehicle, such as a rack position sensor, a rack force sensor, and a vehicle velocity sensor.

The steering angle information may refer to rotation angle information about the steering wheel. The steering angle information may include rotation angle information in which right rotation angles from the neutral position of the steering wheel have positive values, and left rotation angles from the neutral position have negative values. However, without limitations thereto, the steering angle information may also include rotation angle information in which right rotation angles have negative values, and left rotation angles have positive values.

Referring to FIG. 8, the steering control device according to the present embodiments may include a controller 830 controlling the output of the reaction force motor based on the virtual end stop torque upon determining that a preset end stop start angle is reached based on the steering angle information. For example, upon determining that the preset end stop start angle is reached based on the steering angle information, the controller 830 may calculate a normalized angle based on the steering angle information, calculate a virtual spring torque based on the normalized angle, calculate a virtual damper torque based on the virtual spring torque, calculate a virtual end stop torque by adding the virtual spring torque and the virtual damper torque, and control the output of the reaction force motor based on the virtual end stop torque.

The controller 830 may determine whether the preset end stop start angle is reached based on the steering angle information. The end stop start angle may be preset and stored.

However, the end stop start angle is not a fixed value, and the end stop start angle may be adjusted if a curb condition and a condition for changing the end stop start angle are met. Further, an end stop end angle may also be previously set and stored, and the end stop end angle may be adjusted when the end stop start angle is adjusted.

The controller 830 may calculate a normalized angle based on the steering angle information when it is determined that the preset end stop start angle is reached based on the steering angle information. For example, the controller 830 may calculate the normalized angle based on steering angle information, an end stop start angle, and a preset change angle range.

The preset change angle range may refer to an angle range in which the virtual end stop torque value is changed for a virtual end stop. The change angle range may be preset as an angle range experimentally calculated and stored. However, without limitations thereto, the change angle range may be adjusted to an angle range different from a preset angle range.

Since the controller 830 calculates the virtual end stop torque based on the normalized angle rather than the angle information about the measured steering angle, the calculation of the virtual end stop torque and the control thereby may be more easily performed.

The controller 830 may calculate the virtual spring torque based on the normalized angle.

For example, the controller 830 may calculate the virtual spring torque based on the normalized angle and a preset maximum spring torque.

The maximum spring torque may refer to a maximum torque by a virtual spring, experimentally calculated and stored. The virtual spring may refer to a virtual structure for end stop control in a steer-by-wire steering device.

The virtual spring torque is calculated based on a second or higher-order differentiable equation, and the equation may meet preset initial and final conditions. The preset initial and final conditions may be set to six conditions that meet each of the equation, first order differential equation, and second order differential equation. However, without limitations thereto, the number of initial conditions and final conditions may be increased according to a third or higher-order differentiable equation.

The virtual spring torque is calculated based on a second or higher-order differentiable equation, and as the equation meets the preset initial and final conditions, it is possible to block the noise generated at the point where the increase in the virtual spring torque starts and the point where the maximum value is reached.

If at least one of the preset change angle range or the preset maximum spring torque is changed, the coefficient of the equation for calculating the virtual spring torque may be automatically changed, so that the virtual spring torque may be calculated.

The controller 830 may calculate a virtual damper torque based on the virtual spring torque.

Within the virtual end stop range, the virtual spring torque may maintain a constant value until the end stop angle after reaching the maximum value. When the steering angle reaches the end stop end angle, an impact may occur on the steering wheel in the process of giving a feeling that the steering wheel mechanism is locked. Therefore, it is necessary to calculate virtual damper torque to prevent impact that may occur on the steering wheel.

The controller 830 may calculate the virtual damper torque using the normalized angle and spring torque, steering angular velocity and a preset damping ratio.

The virtual damper may refer to a virtual structure for preventing an impact that may occur on the steering wheel in the process of giving a feeling of locking the mechanism. The virtual damper torque may refer to the torque output by the virtual damper.

The steering angular velocity may be sensed and received by the steering angular velocity sensor. However, the present embodiments are not limited thereto. For example, the steering angular velocity may be calculated based on steering angle information received by the steering angle sensor that senses the steering angle at a preset cycle.

The damping ratio may be preset and stored as a damping ratio to prevent impact that may occur on the steering wheel. However, the damping ratio may be changed and stored by settings.

The controller 830 may add the virtual spring torque and the virtual damper torque to calculate a virtual end stop torque, and control the output of the reaction force motor based on the virtual end stop torque. Therefore, it is possible to create a virtual end part that gives a feeling similar to a steering wheel mechanism locking part through output control of the reaction force motor.

Referring to FIG. 8, the steering control device according to the present embodiment may further include a curb determiner 820 determining whether the end stop start angle needs to be adjusted as the wheel touches the curb.

For example, the receiver 810 further receives rack position information and rack force information, and the curb determiner 820 determines whether a condition for changing the preset end stop start angle is met based on the steering angle information, rack position information and rack force information and, if the change condition is met, may change the preset end stop start angle based on the steering angle information.

Further, the curb determiner 820 may determine whether a condition for releasing the changed end stop start angle is met based on the rack position information and the rack force information received after the end stop start angle is changed and readjust the end stop start angle.

For example, the curb determiner 820 may return the changed end stop start angle to the preset end stop start angle if the release condition is met. As another example, the curb determiner 820 may maintain the changed end stop start angle if the release condition is not met. In other words, the curb determining step may return the changed end stop start angle to the preset end stop start angle or maintain the changed end stop start angle based on information received after the end stop start angle is changed.

The curb determiner 820 may change the end stop end angle based on a preset end stop angle range if the preset end stop start angle is changed. The preset end stop angle range may mean an angle range stored and set as a value experimentally calculated and stored for virtual end stop.

The controller 830 may calculate the normalized steering angle, virtual spring torque, virtual damper torque, and virtual end stop torque based on the changed end stop start angle and changed end stop end angle in the curb determiner 820, thereby protecting the steering wheel and system in a state in which the steering direction of the vehicle wheels cannot be changed due to an object, such as a curb, and addressing the noise issue that may occur when the mechanism lock feeling occurs on the steering wheel. In other words, the steering control device according to the present embodiments may perform curb determination and virtual spring torque calculation with a single logic.

According to the present embodiments, the steering control device may reduce memory usage by calculating virtual end stop torque without using a lookup table and address the noise issue at a discontinuous point. Further, according to the present embodiments, the steering control device may determine whether the end stop start angle needs to be adjusted because the wheel touches the curb, and adjust the end stop start angle to protect the steering wheel and the system.

The above-described steering control device may be implemented as, e.g., an electronic control unit (ECU).

According to an embodiment, a computer system (not shown), such as the steering control device, may be implemented as an electronic control unit (ECU). The ECU may include at least one or more of one or more processors, a memory, a storage unit, a user interface input unit, or a user interface output unit which may communicate with one another via a bus. The computer system may also include a network interface for accessing a network. The processor may be a central processing unit (CPU) or semiconductor device that executes processing instructions stored in the memory and/or the storage unit. The memory and the storage unit may include various types of volatile/non-volatile storage media. For example, the memory may include a read only memory (ROM) and a random access memory (RAM).

Specifically, the steering control device according to the present embodiments and the information receiver 810, the curb determiner 820, and the controller 830 included therein may be implemented as some modules of the control device or ECU of the radar system installed in the vehicle.

The control device or ECU of the steering control system may include a processor, a storage device, such as memory, and a computer program capable of performing specific functions, and the above-described receiver 810, curb determiner 820, and controller 830 may be implemented as software modules capable of performing their respective corresponding functions.

In other words, the receiver 810, the curb determiner 820, and controller 830 according to the present embodiments may be implemented as their respective corresponding software modules which are then stored in the memory, and each software module may be performed by a computation processing device, such as the ECU included in the vehicle steering system, at a specific time.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed:

1. A steering control device, comprising:
   a receiving step of receiving steering angle information from a steering angle sensor; and
   a control step of controlling an output of a reaction force motor based on a virtual end stop torque upon determining that a preset end stop start angle is reached based on the steering angle information,
   wherein the virtual end stop torque is calculated by adding a virtual spring torque and a virtual damper torque calculated based on the virtual spring torque, and
   wherein the virtual spring torque is calculated by a normalized angle calculated based on the steering angle information.

2. The steering control method of claim 1, wherein the control step calculates the normalized angle based on the steering angle information and the end stop start angle and a preset change angle range.

3. The steering control method of claim 1, wherein the control step calculates the virtual spring torque based on the normalized angle and a preset maximum spring torque.

4. The steering control method of claim 3, wherein the virtual spring torque is calculated based on a second or higher-order differentiable equation, and
   wherein the equation meets preset initial and final conditions.

5. The steering control method of claim 1, wherein the control step calculates the virtual damper torque using the normalized angle, the spring torque, a steering angular velocity, and a preset damping ratio.

6. The steering control method of claim 1, further comprising a curb determining step of determining whether the end stop start angle needs to be adjusted as a wheel touches a curb after the receiving step.

7. The steering control method of claim 6, wherein the receiving step further receives rack position information and rack force information, and
   wherein the curb determining step determines whether a condition for changing the preset end stop start angle is met based on the steering angle information, the rack position information, and the rack force information and, if the change condition is met, changes the preset end stop start angle based on the steering angle information.

8. The steering control method of claim 7, wherein the curb determining step determines whether a condition for releasing the changed end stop start angle is met based on the rack position information and the rack force information received after the end stop start angle is changed and, if the release condition is met, returns the changed end stop start angle to the preset end stop start angle.

9. The steering control method of claim 8, wherein the curb determining step maintains the changed end stop start angle if the release condition is not met.

10. The steering control method of claim 7, wherein the curb determining step changes an end stop end angle based on a preset end stop angle range if the preset end stop start angle is changed.

11. A steering control device, comprising:
    a receiver receiving steering angle information from a steering angle sensor; and
    a controller controlling an output of a reaction force motor based on a virtual end stop torque upon determining that a preset end stop start angle is reached based on the steering angle information,
    wherein the virtual end stop torque is calculated by adding a virtual spring torque and a virtual damper torque calculated based on the virtual spring torque, and
    wherein the virtual spring torque is calculated by a normalized angle calculated based on the steering angle information.

12. The steering control device of claim 11, wherein the controller calculates the normalized angle based on the steering angle information and the end stop start angle and a preset change angle range.

13. The steering control device of claim 11, wherein the controller calculates the virtual spring torque based on the normalized angle and a maximum spring torque.

14. The steering control device of claim 13, wherein the virtual spring torque is calculated based on a second or higher-order differentiable equation, and
    wherein the equation meets preset initial and final conditions.

15. The steering control device of claim 11, wherein the controller calculates the virtual damper torque using the normalized angle, the spring torque, a steering angular velocity, and a preset damping ratio.

16. The steering control device of claim 11, further comprising a curb determiner determining whether the end stop start angle needs to be adjusted as a wheel touches a curb.

17. The steering control device of claim 16, wherein the receiver further receives rack position information and rack force information, and
    wherein the curb determiner determines whether a condition for changing the preset end stop start angle is met based on the steering angle information, the rack position information, and the rack force information and, if the change condition is met, changes the preset end stop start angle based on the steering angle information.

18. The steering control device of claim 17, wherein the curb determiner determines whether a condition for releasing the changed end stop start angle is met based on the rack position information and the rack force information received after the end stop start angle is changed and, if the release condition is met, returns the changed end stop start angle to the preset end stop start angle.

19. The steering control device of claim 18, wherein the curb determiner maintains the changed end stop start angle if the release condition is not met.

20. The steering control device of claim 17, wherein the curb determiner changes an end stop end angle based on a preset end stop angle range if the preset end stop start angle is changed.

* * * * *